United States Patent [19]

Ashton et al.

[11] Patent Number: 5,317,692
[45] Date of Patent: May 31, 1994

[54] METHOD AND APPARATUS FOR BUFFER CHAINING IN A COMMUNICATIONS CONTROLLER

[75] Inventors: James L. Ashton, Cary; Keith E. Karlsson, Raleigh, both of N.C.

[73] Assignee: International Business Machines Corporation, Armonk, N.Y.

[21] Appl. No.: 645,077

[22] Filed: Jan. 23, 1991

[51] Int. Cl.$^5$ .............................. G06F 9/00
[52] U.S. Cl. .................................. 395/200; 395/250
[58] Field of Search ............ 364/200, 900, 238.3, 364/239.4, 926.9, 926.93; 395/250

[56] References Cited

U.S. PATENT DOCUMENTS

| 4,509,113 | 4/1985 | Heath | 364/200 |
| 4,672,570 | 6/1987 | Benken | 395/200 |
| 4,954,983 | 9/1990 | Klingman | 364/900 |
| 5,077,655 | 12/1991 | Jinzaki | 395/200 |
| 5,101,477 | 3/1992 | Casper et al. | 395/250 |

Primary Examiner—Dale M. Shaw
Assistant Examiner—Sang Hui Kim
Attorney, Agent, or Firm—Jerry W. Herndon

[57] ABSTRACT

Method and apparatus in a communications controller to transfer data between a host computer and the controller. The communications controller includes a channel adapter (CA) and a central control unit (CCU) for controlling the operation of the CA. In response to a request from the CCU, the channel adapter transfers data between the host computer and the channel adapter to or from a linked list of buffers until all messages contained in the linked list have been transferred. Only after all messages in the present transmission have been transferred, the CA interrupts the CCU to signal completion. In a preferred embodiment, the channel adapter includes a microprocessor and a read-only-memory containing programmed instructions for controlling the microprocessor. Together, the microprocessor under control of the read-only-memory instructions form an apparatus for carrying out the method.

4 Claims, 7 Drawing Sheets

METHOD AND APPARATUS FOR BUFFER CHAINING IN A COMMUNICATIONS CONTROLLER

TECHNICAL FIELD

This invention relates to the transfer of data between communication controllers and host data processing systems in general and, specifically, to improved apparatus and method for administering such data transfers, thereby improving the overall utilization of channels between communication controllers and hosts.

BACKGROUND OF THE INVENTION

Many networking systems consist of communication controllers which are connected via channel adapters to host data processors. Such communication controllers which are also equipped with communication adapters which provide access by means of telephone connections to other communication controllers, cluster controllers and user terminals. In addition to one or more channel adapters for connection to a host, a typical communication controller has a Central Control Unit (CCU), a main memory and a Bus Control Unit (BCU). Once a channel adapter is started by the CCU to transfer or receive data to or from a host, respectively, the adapter accesses the main memory directly to perform the transfer. To accomplish the transfer, the CCU executes instructions that reside in the main memory to control the channel adapters to perform the actual data transfer. As the channel adapter performs its work, it periodically interrupts the CCU.

Many different types of communications controllers have been used in the past to transfer data to and from a host. The interface between a communications controller and the host generally takes the following form. The host, when it is ready, issues either a read or write command to the controller, which causes an interrupt of the CCU. Assuming that the command is a write, for example, data in the form of one or more messages is then transferred from the host, via a channel adapter, to the CCU. The host signals end of message (EOM) at the end of each message and signals end of transmission (EOT) after all messages available at that time are transferred. In the channel adapters in use today, the channel adapter interrupts the CCU at intermediate points of a message transfer to allow the CCU to send status messages to the host. At the end of a message transfer, a channel adapter again interrupts the CCU to allow the CCU to send a final status message to the host. During the actual transfer of a message, the channel adapter further interrupts the CCU a number of times to allow it to process intermediate data received during a message write from the host or to prepare further data for transmission to the host during a message read transfer. The number of such interrupts depends on the particular type of channel adapter involved, as further described below.

To accomplish the above protocol between a communications controller and a host, the interface between a CCU and a channel adapter has taken a number of forms in the prior art. For example, IBM offers or has offered six different types of channel adapters for use in different ones of its communications controllers, such as the 3725 and 3745 controllers. The Type 1 channel adapter interrupts the CCU after receiving or sending each buffer of four bytes. This is in addition to the initial and status interrupts mentioned above. This is an inexpensive hardware design, since most of the functions are coded in the CCU software. More important, however, is that the type 1 adapter creates a very large number of interrupts to the CCU.

The types 4, 5 and 6 channel adapters improve the operation of the type 1 adapter by increasing the size of a buffer from a maximum of 4 bytes to a maximum of 256 bytes. However, the potential number of interrupts is still large and remains a limitation on performance.

The Type 2 channel adapter uses a list of control words to allow a chain of buffers to be transferred before interrupting the CCU. The control words are linked to each other by the requirement that the list has to reside in contiguous memory and are accessed in consecutive order. Each control word includes a data address of a buffer for a corresponding block of transferred data and a count of bytes to be transferred from or to the buffer. In addition, the buffers themselves include pointers for creating a buffer linked list for individual messages and another linked list for individual messages. The CCU administers the list of control words and the channel adapter administers the lists of buffers and messages. Contiguous words of the control word list may point to the same buffer, depending on the size of the buffer and the number of bytes to be transferred under control of the control word. Thus, the CCU deals with the list of control words to maintain the order of byte transfer, while the channel adapter deals with the buffer and message linked lists. The type 2 channel adapter is expensive in terms of hardware, because most of its functions are implemented in hardware. The number of interrupts of a CCU is reduced over the types 1 and 4 through 6 because of the linking of control words. However, there is still a substantial amount of CCU processing consumed in responding to the need for status interrupts to a host. In addition, an excessive amount of CCU processing power is consumed because of the need to administer the control word list.

The Type 3 channel adapter provides two physical paths between a host and communications controller and uses the same linking of control words as the Type 2 channel adapter. This adapter improves the type 2 adapter because of the additional capacity added by the second path. However, the CCU still suffers from the same limitations of administering control word lists and responding to status interrupts.

The reader is referred to the following references for additional details of the operation of prior art communication controllers:

"IBM System/360 and System/370 I/O Interface Channel to Control Unit Original Equipment Manufacturers Information", GA22-6974, IBM Corporation;

"IBM 3745 Communication Controller Principles of Operation", SA33-0102, IBM Corporation;

"IBM 3725 Communication Controller Principles of Operation", GA33-0013, IBM Corporation;

"IBM 3704, 3705-I, 3705-II, Communication Controller Principles of Operation", GC30-3004, IBM Corporation; and "Systems Network Architecture: Formats"; Publicaiton GA27-3136; 1987; International Business Machines Corporation.

SUMMARY OF THE INVENTION

The invention is a method and apparatus to carry out the method in a communications controller to transfer data between a controller and a host computer. The communications controller includes a channel adapter (CA) which forms the data interface to a data link to the host computer. The communications controller further includes a central control unit (CCU) for controlling the operation of the CA. The data to be transferred includes one or more individual messages that are appropriately delineated. In response to a request from the CCU, the channel adapter transfers data between the host computer and the channel adapter to or from a linked list of buffers until all messages contained in the linked list have been transferred. Only after all messages in the present transmission have been transferred, the CA interrupts the CCU to signal completion.

The CA detects the end of each message during transfer, and transmits an intermediate status report to the host computer in response thereto. One type of data transfer is from the host to the communications controller. In this case, the CA writes the data into the linked list of buffers provided by the CCU as the data arrives. When an end-of-message is detected, the CA initializes a next message pointer in one of the buffers associated with the message just received to point to the first buffer in the linked list containing the next message. In one embodiment, the CA does not interrupt the CCU until an end-of-transmission signal is detected from the host. This improves throughput performance from the CCU's point of view. However, it has been found that this mode of operation during data reception from the host degrades performance from the point of view of users at terminals, and the like, that ultimately receive the data from the CCU. This is because the individual messages in a single transmission are generally destined for different users. When interrupts of the CCU are delayed until the transmission is complete, different users experience delays in the receipt of their data from the CCU. Therefore, in the preferred embodiment, the CCU is interrupted at the end of each message, as well as at the end-of-transmission.

When the CA receives a request to transfer data from the communications controller to the host, the CA reads data from the linked list of buffers provided by the CCU. In this case, each end-of-message is detected from markers in the linked list. In response to an end-of-message, the CA transmits intermediate status reports to the host computer and then determines the next buffer in the linked list associated with the next message to be transferred, if any, from a link list pointer. The CCU is interrupted preferably only at the end-of-transmission.

In a preferred embodiment, the channel adapter includes a microprocessor and a read-only-memory containing programmed instructions for controlling the microprocessor. Together, the microprocessor under control of the read-only-memory instructions form an apparatus for carrying out the above summarized method.

DETAILED DESCRIPTION

Figure 1:
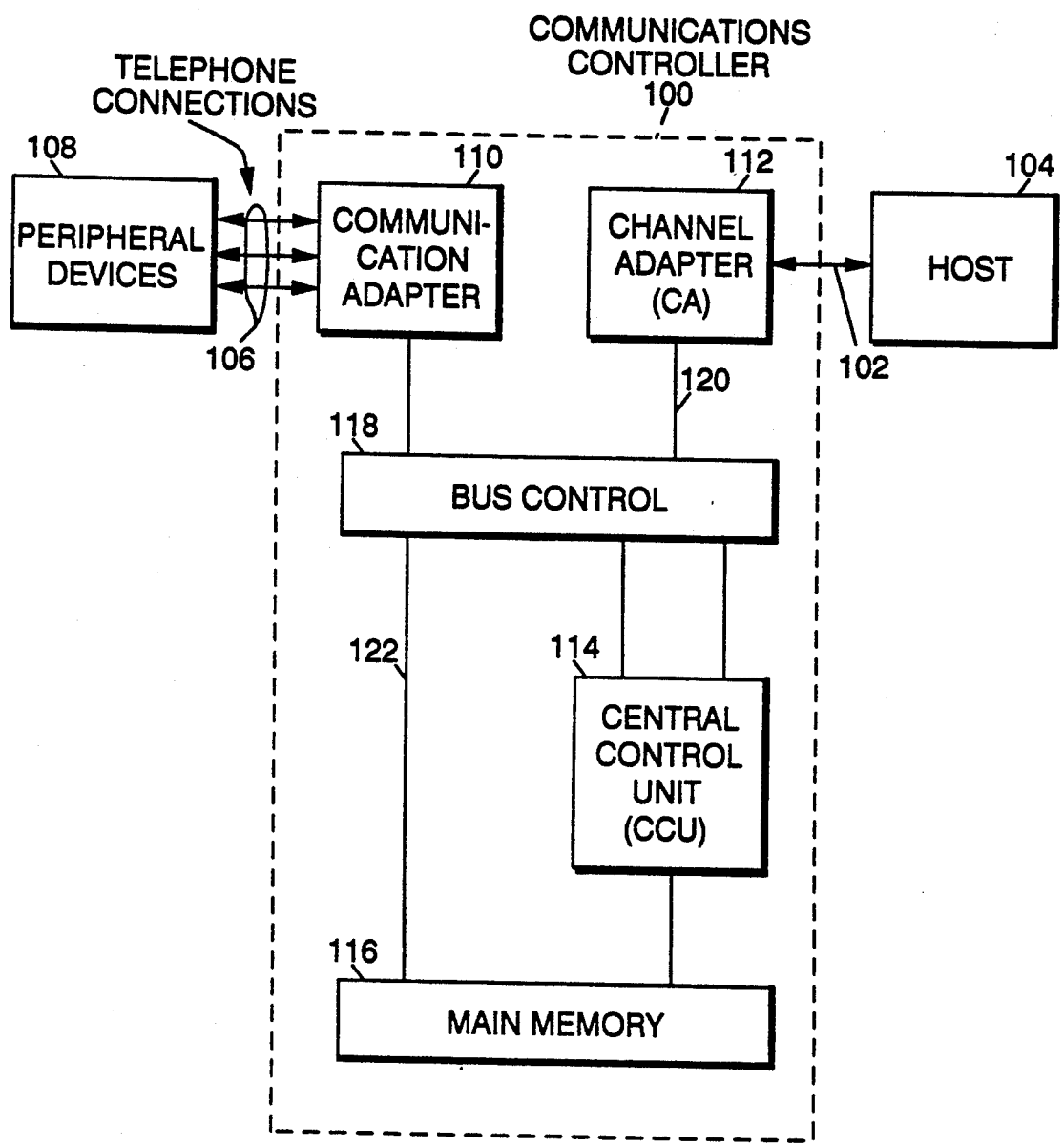
FIG. 1 shows a block diagram of a communications controller, including a channel adapter, and connections between, the controller, peripheral devices such as user terminals, and a host computer.

FIG. 1 shows a generalized structure of a system including a communications controller 100 connected via a data channel 102 to a host processing system 104 and via telephone connections 106 to peripherals devices 108, such as user terminals, other controllers, and the like. The purpose of the communications controller 100 is to control the transfer of data between the devices 108 and the host 104. For this purpose, the controller 100 includes a communications adapter 110 for interfacing with the telephone connections and a channel adapter (CA) 112 for interfacing with the host channel 102. A central control unit (CCU) 114 executes software instructions to control the operation of the communications adapter 110 and the CA 112. The CCU also interfaces with a main memory 116 in which linked lists of buffers of data are maintained and accessed by the communications adapter 110 and the CA 112 as data flows between the peripheral devices and the host. The communications adapter 110 and the CA 112 directly access the main memory as needed to write into or read from the buffers as the data is being transferred. A bus control circuit 118 facilitates the required communications between the individual circuits of the communications controller 100. In particular, this bus structure includes the means by which CCU 114 can communicate main memory 116 addresses of buffer linked lists to CA 112 and an interrupt structure by means of which the CA 112 may interrupt the CCU as needed during the transfer of data. In addition, bus control 118 also interfaces with the main memory 116 via a bus 122. Bus 122 is used by CA 112 to directly read or store data in the process of transfer between the communications controller and the host.

As mentioned in the Background of the Invention, in the prior art, numerous interrupts of the CCU 114 are stimulated by the CA 112 during data transfer with the host 104. It may be recalled that such interrupts include an initial one from the CA in response to an initial data read or write command from the host to allow the CCU to signal a ready condition to the host. In addition, the prior art includes other interrupts from the CA 112 to the CCU as individual blocks of data are sent or received by the CA 112. These interrupts allow the CCU to process the incoming buffers of data in the case of a host write command, or to provide more buffers of data to the CA 112 in the case of a host read command. Finally, interrupts from the CA 112 to CCU 114 include individual interrupts to allow the CCU to respond to the host with intermediate status responses during the transfer of data and with a final status response at the end of the transfer of a full message.

Figure 2:
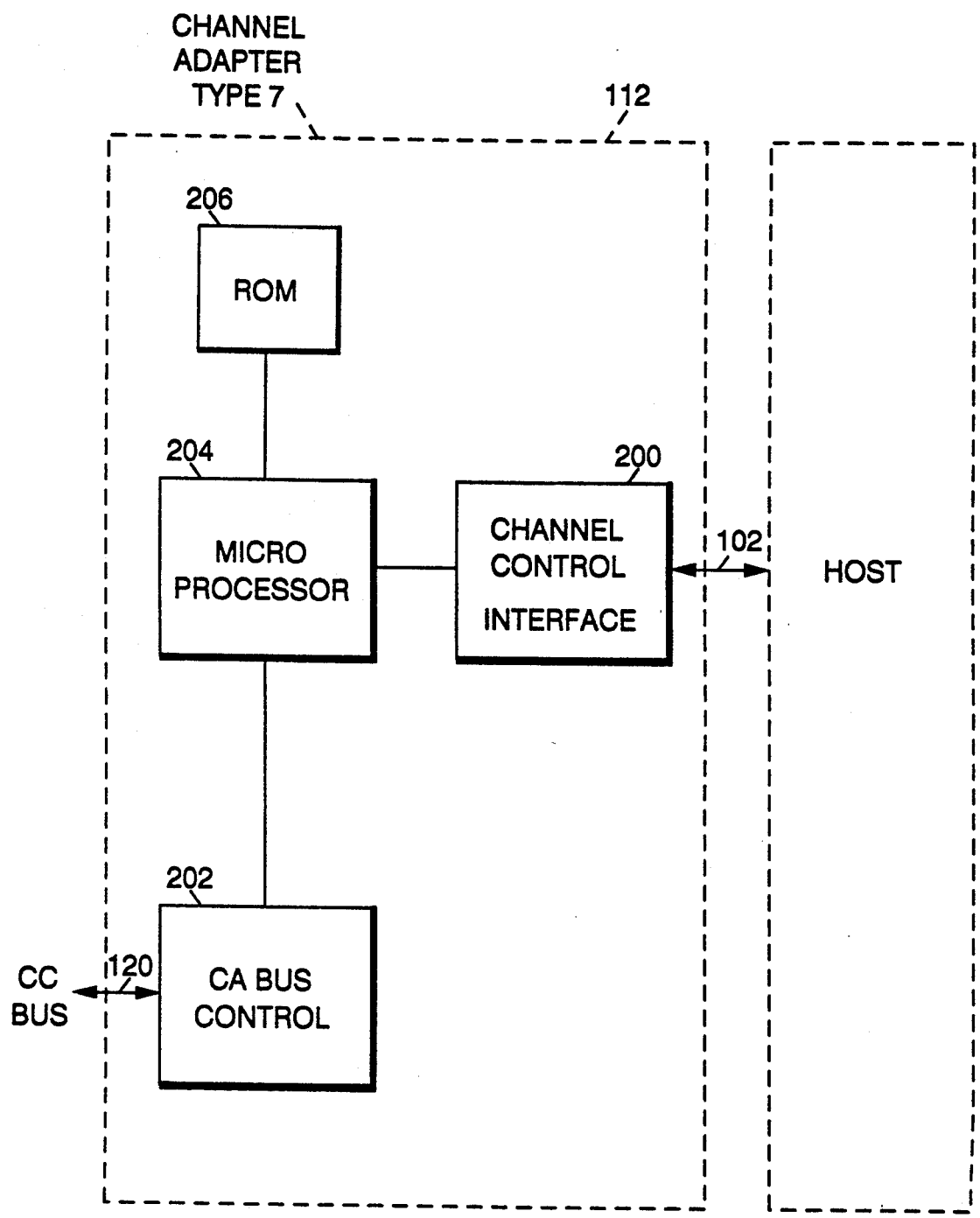
FIG. 2 shows more details of the channel adapter of FIG. 1.

FIG. 2 shows an illustrative generalized structure of the CA 112. A channel control interface 200 provides the physical access to the host channel 102. A channel adapter bus control circuit 202 provides the physical access to the communications controller bus 120. A microprocessor 204 executes instructions stored in a read-only-memory (ROM) 206 to perform data transfers in accordance with the invention.

Figure 3:
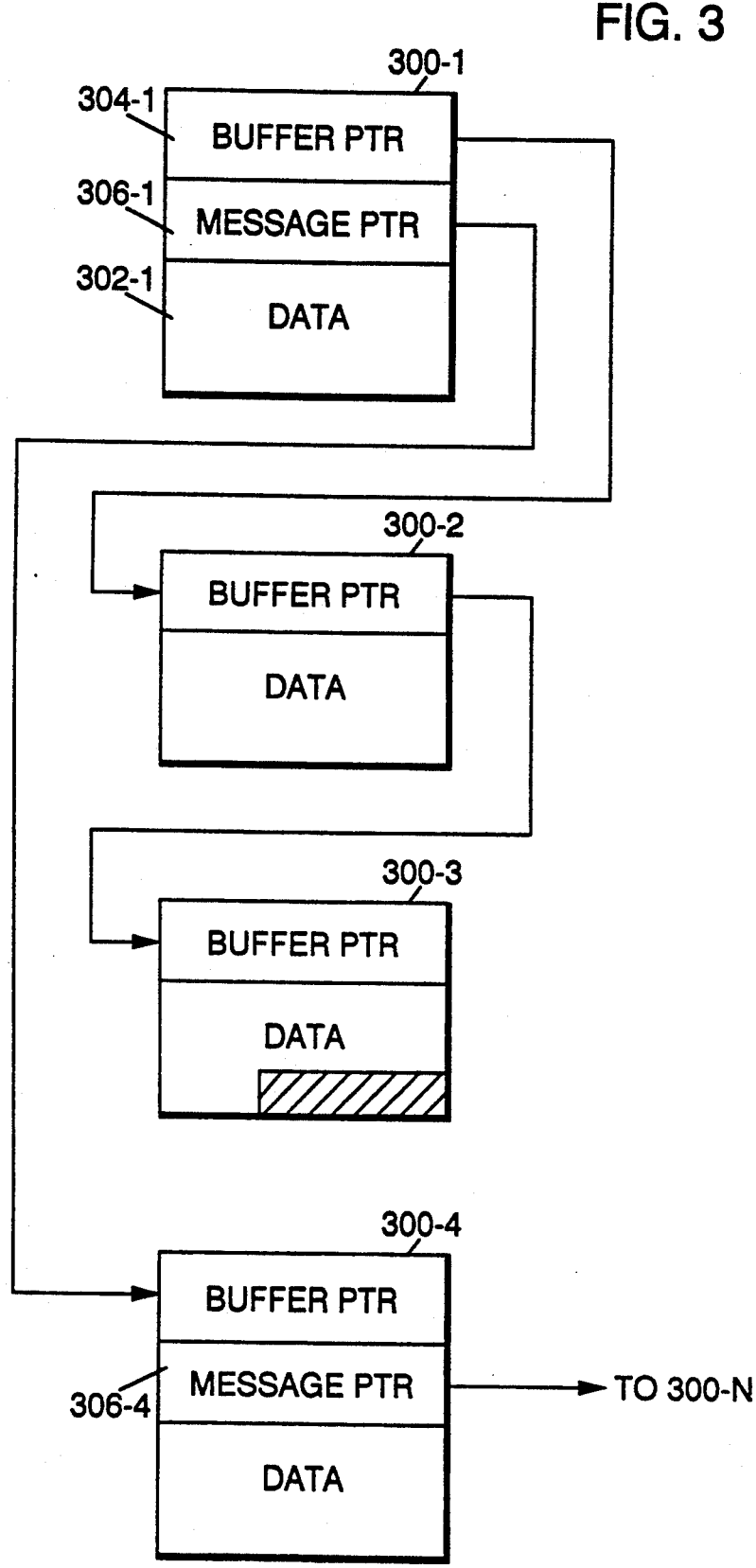
FIG. 3 shows one illustrative format of a linked list of buffers operated upon by the channel adapter to transfer data into and from the host computer.

FIG. 3 shows an illustrative format of a linked list of buffers that is processed by CA 112. This list will be described more particularly below in conjunction with a description of the programs residing in ROM 206. Generally, such a list includes a number of individual buffers 300-1 through 300-N. Each individual buffer includes space such as 302-1 into which data is read or written by CA 112 during a transfer. Each buffer also includes a buffer pointer, such as 304-1, which points to the next buffer on the list for an individual message. The next buffer pointer 304 of the last buffer of a message (such as 300-3) contains a message end marker, such as "0". The beginning buffer for each message also contains a message pointer, such as 306-1 and 306-4. A message pointer points to the beginning buffer for the next message in the linked list.

In accordance with one aspect of the invention to be described, most of the interrupts of the CCU are eliminated. The interface between the CCU 114 and the CA 112 is improved such that the CCU is interrupted by CA 112 at the beginning of a data transfer in response to a read or write command from the host and at the end of a data transfer, which may contain plural independent messages, to respond to the host with a final status response. Preferably, the CCU is interrupted at the end of each message during the execution of a write command from the host. This improves performance from the peripheral users' point of view. However, this is an option and operation may be altered such that the CCU is interrupted only at the end of a write operation. Intermediate status reports to the host are handled by the channel adapter without interrupting the CCU, as in past systems.

In response to the initial interrupt on a read or write command, the CCU 114 provides CA 112 with a pointer to a linked list of buffers from which data is taken by the CA 112 in the case of a host read or into which data is written in the case of a host write. In the case of a read operation, the linked list of buffers is established by the CCU 114 and the CA 112 administers the transfer of all data in the list in accordance with the invention. Importantly, the list of buffers may contain one or more independent messages that are available at the communication controller at the time the host 104 issues a read command. During a write operation, however, the CA 112 performs the linking of buffers between messages as they arrive from the host so that the CCU 114 is able to distinguish the individual messages.

Figures 4, 4A:
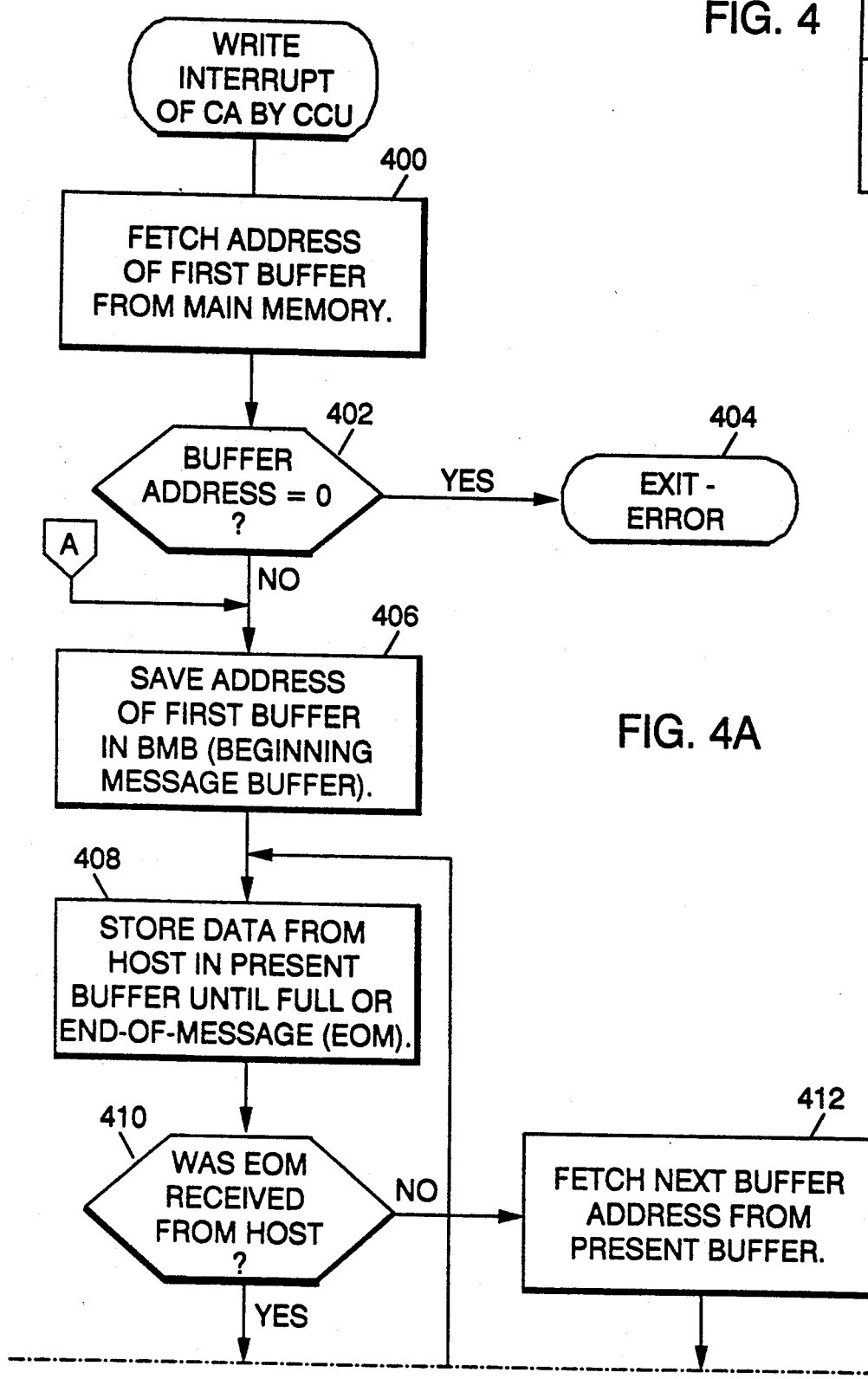
FIGS. 4A and 4B when arranged according to FIG. 4 the method steps carried out by the channel adapter to transfer data from the host computer to the communications controller.
Figure 4B:
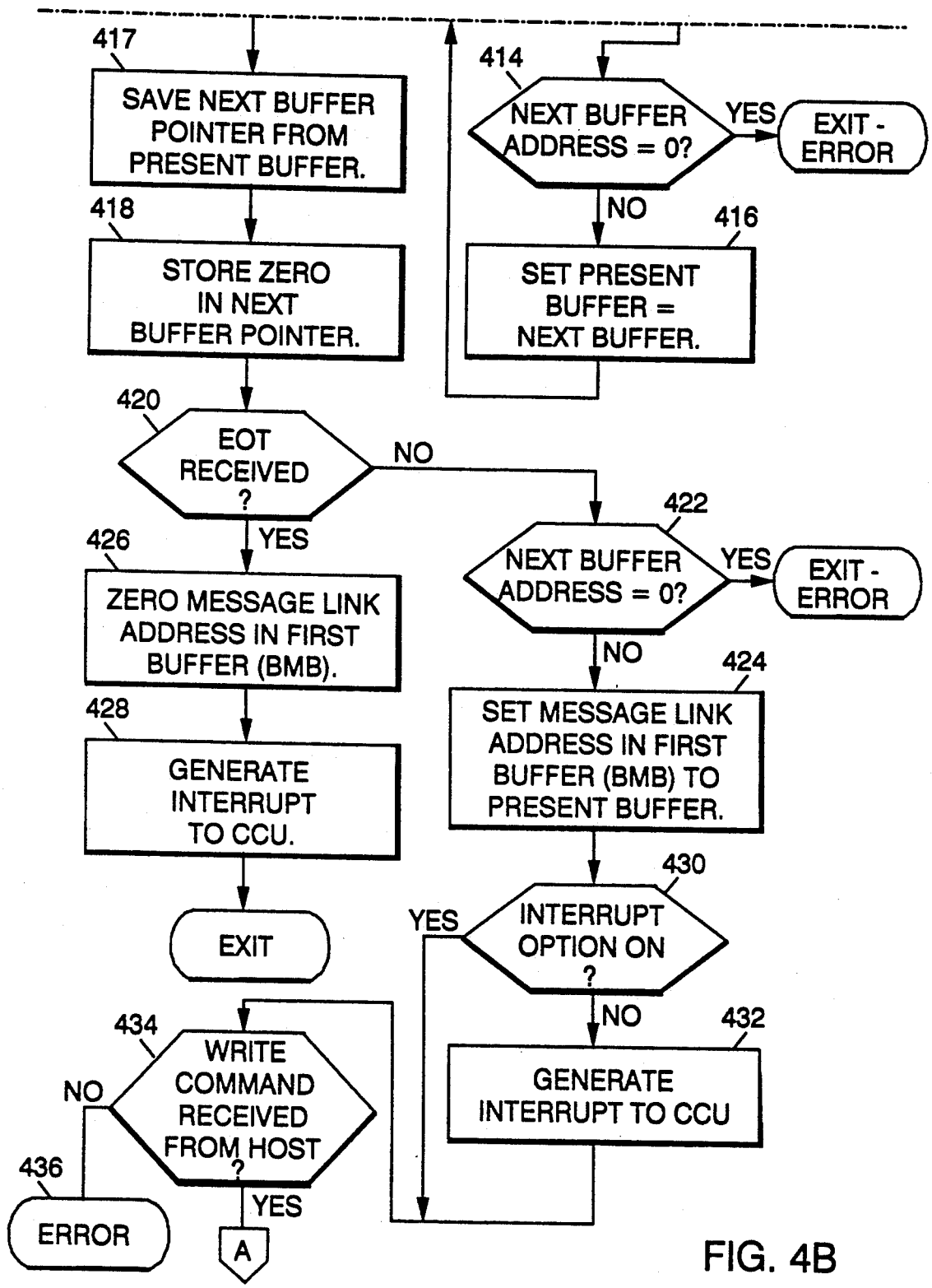

FIGS. 4(a) and 4(b) show an illustrative preferred embodiment of the program steps executed by CA 112 in response to a write command from host 104. This program is executed by the CA in response to signals on bus 102 that indicate the beginning of a write command. Step 400 first directly accesses a predefined control word that has been stored in the main memory by CCU 114 that contains the address of a first empty buffer of a pool of buffers for receiving data from host 104. The pool of buffers is prelinked by CCU 114. That is, the next buffer pointer 304 of each buffer of the pool points to the next empty buffer on the list. As will be described, it is the responsibility of CA 112 to delineate individual messages of data incoming from the host 104 by modifying the appropriate next buffer pointers 304 and the message pointers 306.

It is possible that the pool of empty buffers may become exhausted during a data transfer. Step 402 determines if this is the case by examining the obtained buffer address for the value "0". If the address is zero, step 404 executes an error exit, which causes the host to queue data until CCU buffers become available. This is accomplished via conventional processes described in reference SA33-0102 that form no part of the invention and are therefore not discussed in detail. In the normal case, the buffer pool is not empty. In this case, step 406 saves the address of this first buffer. This address will be referenced again later by the program when the end of the present message is detected. Step 408 represents an iterative step which collects data as it arrives from channel 102 and stores the data in the present buffer. This step repeats until the present buffer becomes full or an end-of-message (EOM) signal is detected as a sequence of control signals on control and data leads of channel 102. Such sequences of control signals are discussed in detail in reference GA22-6974. When either of these events causes the termination of step 408, step 410 determines which of these events occurred. Assume for the time being that the present buffer has become full, rather than the occurrence of an EOM. Step 412 addresses the next buffer pointer 304 in the present buffer to obtain the address of the next buffer in the pool. Step 414 determines if there are no more buffers by examining the buffer address for "0". If a new buffer is available, step 416 sets the present buffer to the address of the new buffer. At this point, the steps 408 through 416 are repeated as necessary until an EOM signal is received from host 104. At this point, step 417 saves the next buffer pointer from the present buffer for later use. Step 418 stores the value "0" in the next buffer pointer 304 of the present buffer to mark the end of the present message. Step 420 determines if there is a next message by inquiring if an end-of-transmission (EOT) signal (a prescribed sequence of signals on data and control leads of bus 102) has been received from the host. If it has, this marks the end of this block of messages to be received from the host on this write operation. Step 426 writes a zero into the message link address of the first buffer of the last message to terminate the linked list of buffers and messages. At this point, the operations of CA 112 are complete until the next read or write command from the host. It remains for the communications controller to process the data just received and to report a final status condition to the host respecting the operation. Assuming that the EOT has not been received at step 420, then the buffer linked list must be updated to prepare for receipt of the next message from the host. Step 422 determines if the pool of free buffers has not yet been exhausted by examining the next buffer pointer saved in step 417 for a nonzero value. Assuming that another free buffer is available, step 424 initializes the message link address contained in the first buffer of the message just received to point to the present buffer. In the preferred embodiment, CA 112 interrupts the CCU at this point at step 432 so that the message just received can be immediately sent to the final user destination by the CCU. However, as mentioned in the Summary of the Invention, an alternative embodiment defers CCU interrupts until receipt of an end-of-transmission signal from the host. An option which controls which embodiment is in effect is interrogated at step 430. The option can be activated by means of a switch (not shown), or by any other suitable mechanism, such as stored program parameters. If the preferred embodiment is in effect, the CCU processes the message just received by the CA 112 at the same time as the CA continues to receive the next message, if any. In either event, step 434 next determines if a write command has now been received from the host. Timing of the host-CA communications is such that a write command should be present. If not, an error condition is indicated and an error exit is taken at 436. Otherwise, processing of the next message is begun by returning to step 406.

Figure 5A:
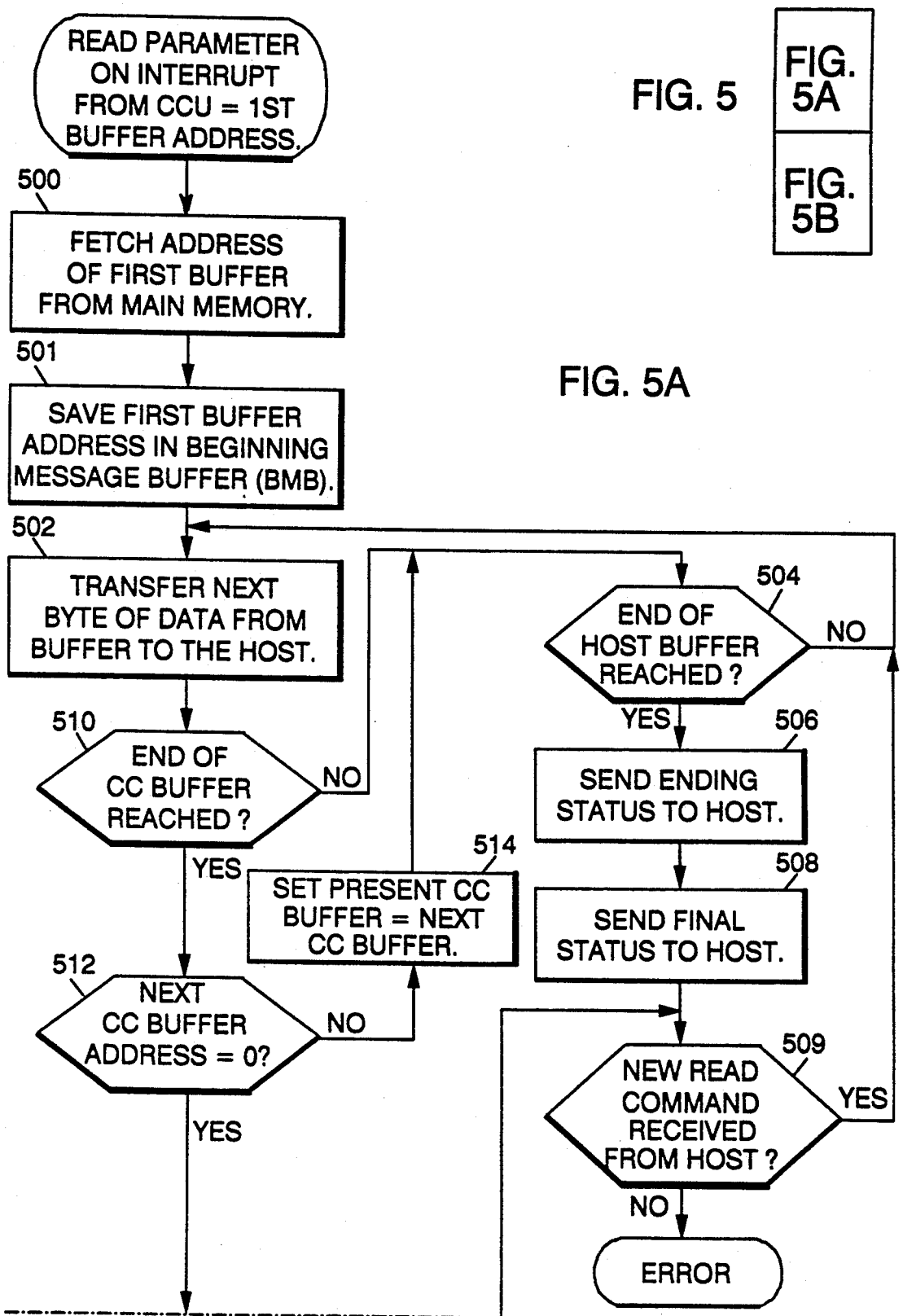
FIGS. 5A and 5B when arranged according to FIG. 5 the method steps carried out by the channel adapter to transfer data from the communications controller to the host computer.
Figure 5B:
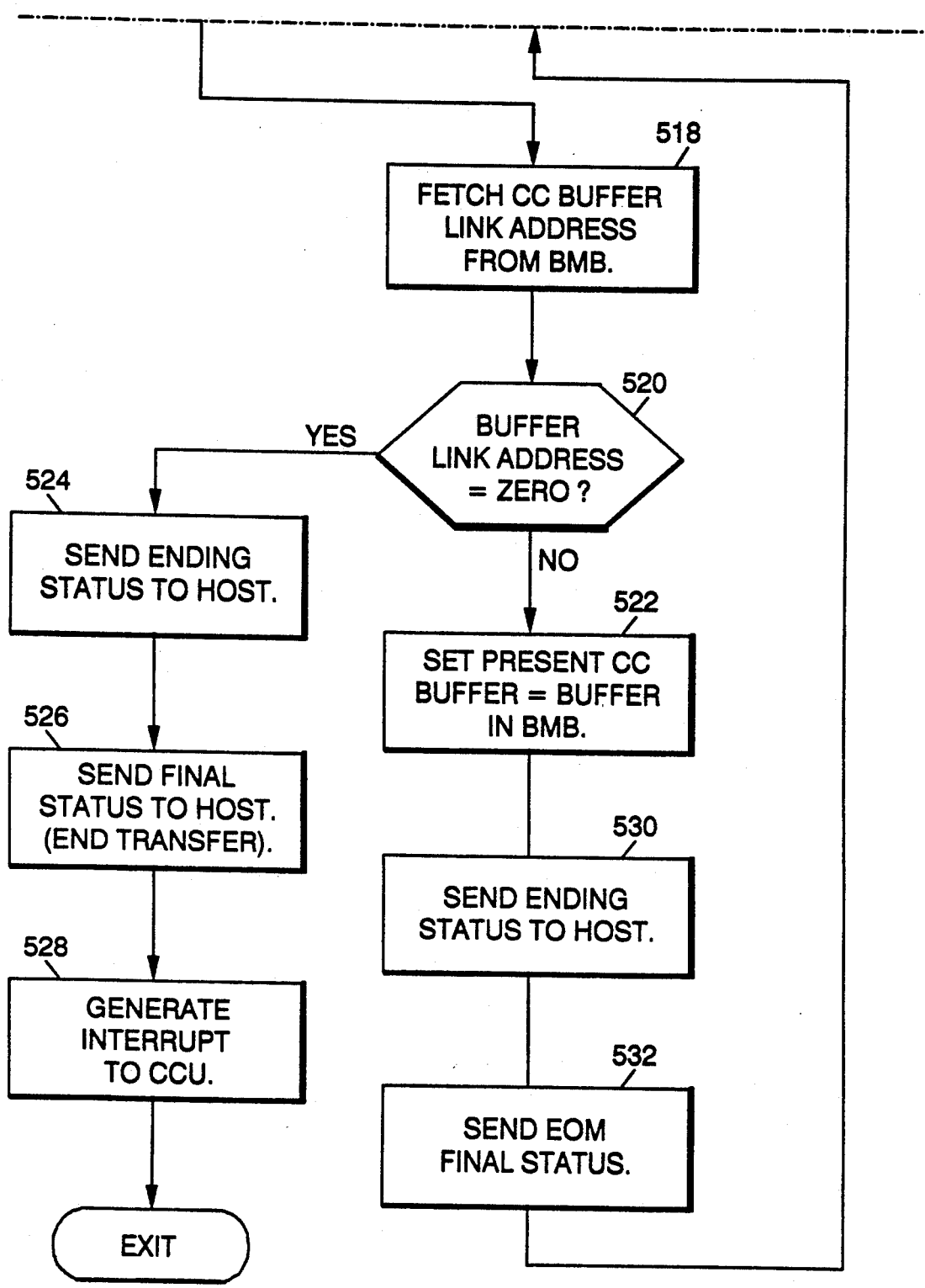

FIGS. 5(a) and 5(b) show an illustrative flowchart of steps to be performed by CA 112 when the host issues a read command. Because the size of a buffer used by the host to send and receive data may be different from the buffer size used by the communications controller, it is important for the channel adapter to keep track of the number of bytes transmitted to the host to prevent a host buffer overflow. The size of the host buffer, and the number of read commands that the host will issue during a single transmission is communicated to the communications controller 100 when the session is initially established on link 102. This information is transferred as part of an XID (Identification Exchange) message and is retained by the controller for subsequent transfers. Because the XID message forms no part of the invention and is also fully described in Systems Network Architecture (SNA) literature, it is not further described here. A good reference is GA27-3136 mentioned earlier. A read command from the host is interpreted by CCU 114 and it generates an interrupt to CA 112 to initiate the read operations. The main memory address of a first buffer of a linked list containing data to be sent to the host is available in main memory from the CCU when the program in FIG. 5 is begun. Step 500 fetches this first buffer address from main memory. Step 501 saves the first buffer address in a temporary variable Beginning Message Buffer (BMB) for later use in finding linked messages in the link list. Step 502 sends the first byte of data from the buffer to the host. Step 510 next determines if the end of the present communications controller buffer has been reached. If all bytes of the present buffer have not yet been transmitted, Step 504 determines if the end of the host buffer has been reached. CA 112 does this by merely keeping an updated count of the number of bytes transmitted to the host (not shown) and reinitializing the count each time the count reaches the number of bytes in a host buffer. If the host buffer is not yet full, the next byte of the present communications controller buffer is sent at step 502. When it is determined that the host buffer is full, step 506 and 508 send intermediate status reports to the host. Status reports are covered in detail in reference GA22-6974. Step 509 now determines if a read command is present from the host. A read command should be present from the host. Therefore, step 509 transfers control to an error exit if this is not the case. Otherwise, return is made to step 502 to continue the above process for the next byte of the communications controller buffer.

When the present buffer is exhausted at step 510, step 512 fetches the address of the next buffer from the present buffer and determines if its value is zero. A zero value signals an end-of-message (EOM) condition. If the present message is not yet completed, step 514 sets the present buffer to that just obtained from the linked list and repeats the steps described above beginning at step 504 to transmit the new buffer data to the host. If the present message has been completed, step 518 fetches the next buffer address from the first buffer of the prior message (BMB). If this buffer address is nonzero, then another message remains for transmittal. In this event, step 522 initializes the present buffer to that pointed to by the buffer link address contained in BMB. Steps 530 and 532 send an ending status signal and an EOM signal to the host. This allows the host to identify the individual messages in the transmission now being sent. Assuming that a new read command is now present at step 509, the above steps are repeated to transmit the next message to the host. At step 520, the communications controller buffer that begins the next message for transmittal, if any, must now be determined. If the next buffer address has a value of zero, this signals the end of the transmission to be sent to the host on this read operation. In this event, steps 524 and 526 send the ending and final status reports to the host to indicate an end-of-transmission. Since the entire transmission has been sent to the host, step 528 generates an interrupt of the CCU 114 to signal it to prepare for the next operation request from the host.

It is to be understood that the above described arrangements are merely illustrative of the application of principles of the invention and that other arrangements may be devised by workers skilled in the art without departing from the spirit and scope of the invention.

We claim:

1. In a system comprising a host computer, a communications controller and a data link connecting the communications controller to the host computer, wherein the communications controller includes a main memory, a channel adapter (CA) as the data interface to the data link, and a central control unit (CCU) for controlling the CA, a method of transmitting data between the host computer and the communications controller, said data including one or more individual delineated messages, and a plurality of buffers in the main memory for storing the data, wherein each of the buffers contains a next buffer pointer for forming a linked list and a next message pointer, said method comprising the steps of
    A) transmitting a data transfer request, including a pointer to the first buffer in a linked list, from the CCU to the CA,
    in response to the data transfer request at the CA,
    B) transferring data until the present buffer is exhausted or until an End-of-Message (EOM) signal is received,
    C) if an EOM signal has not been received, determining the next buffer pertaining to the present message and repeating step B),
    D) otherwise, determining if there is another message to be transferred,
    E) if there is another message to be transferred, determining from the next message pointer of one of the buffers of the last message the first buffer pertaining to the next message, and repeating steps B through D, and
    F) if there is no other message to be transferred, interrupting the CCU.

2. The method of claim 1 further comprising the step of interrupting the CCU at the end of each message on a data write operation from the host to the communications controller.

3. A channel adapter (CA) for use with a communications controller for transferring data between the communications controller and a host computer, said controller including a main memory and a central control unit (CCU) for controlling the channel adapter, said channel adapter comprising a read-only-memory and a microprocessor, said read-only-memory containing programmed instructions for controlling the microprocessor and in the aggregate comprising means responsive to a data transfer request and a pointer to a linked list of buffers in the main memory from the CCU for transferring data to or from a present one of the buffers of the linked list, means for detecting the end of the present buffer, means responsive to signals in the data being transferred for detecting an end-of-message signal, means responsive to the end-of-buffer detecting means and to the means for detecting the end-of-message signal for fetching the address of the next buffer from the present buffer, means responsive to the means for detecting the end-of-message signal for determining if there is another message in the linked list to be transferred, and means responsive to the determining means for interrupting the CCU when all messages have been transferred.

4. The channel adapter of claim 3 further comprising means responsive to the means for detecting the end-of message signal from the host for interrupting the CCU at the end of each message.

* * * * *